(12) United States Patent
Heiszwolf et al.

(10) Patent No.: US 10,974,195 B2
(45) Date of Patent: Apr. 13, 2021

(54) PROCESS FOR TREATING FLUE GASES IN CDS FLUE GAS TREATMENT

(71) Applicant: S. A. Lhoist Recherche et Developpement, Ottignies-Louvain-la-Neuve (BE)

(72) Inventors: Johan Heiszwolf, Overijse (BE); Alain Brasseur, Grace-Hollogne (BE); Mehdi Mazzoun, Rhode-Saint-Genese (BE)

(73) Assignee: S. A. Lhoist Recherche et Developpement, Ottignies-Louvain-la-Neuve (BE)

( * ) Notice: Subject to any disclaimer, the term of this patent is extended or adjusted under 35 U.S.C. 154(b) by 0 days.

(21) Appl. No.: 16/636,952

(22) PCT Filed: Sep. 6, 2018

(86) PCT No.: PCT/EP2018/074075
§ 371 (c)(1),
(2) Date: Feb. 6, 2020

(87) PCT Pub. No.: WO2019/048582
PCT Pub. Date: Mar. 14, 2019

(65) Prior Publication Data
US 2020/0164311 A1   May 28, 2020

(30) Foreign Application Priority Data
Sep. 6, 2017 (EP) .................................... 17189626

(51) Int. Cl.
*B01D 53/50* (2006.01)
*B01D 53/80* (2006.01)
*B01D 53/83* (2006.01)

(52) U.S. Cl.
CPC ............ *B01D 53/80* (2013.01); *B01D 53/505* (2013.01); *B01D 53/508* (2013.01); *B01D 53/83* (2013.01); *B01D 2251/404* (2013.01); *B01D 2251/604* (2013.01); *B01D 2258/0283* (2013.01)

(58) Field of Classification Search
CPC .................. B01D 53/508; B01D 53/83; B01D 2251/404; B01D 2251/604; B01D 2257/302; B01D 2258/0283; B01J 8/18; B01J 8/24; B01J 20/041; C01P 2006/12; C01P 2006/14

See application file for complete search history.

(56) References Cited

U.S. PATENT DOCUMENTS

| | | | |
|---|---|---|---|
| 4,670,237 A * | 6/1987 | Graf | B01D 53/508 423/244.07 |
| 6,322,769 B1 | 11/2001 | Langelin | |
| 8,906,333 B1 | 12/2014 | Appelo | |
| 2009/0162269 A1 | 6/2009 | Barger et al. | |
| 2009/0229462 A1 | 9/2009 | Laudet et al. | |
| 2009/0246117 A1 * | 10/2009 | Tilquin | C04B 2/08 423/640 |
| 2014/0352530 A1 | 12/2014 | Svensson et al. | |
| 2015/0375168 A1 * | 12/2015 | Suzuki | B01D 53/75 422/170 |
| 2018/0361393 A1 * | 12/2018 | Biehn | B01D 53/83 |
| 2019/0389735 A1 * | 12/2019 | Aubry | B01J 20/28083 |
| 2020/0188846 A1 * | 6/2020 | Tate | C04B 2/06 |

FOREIGN PATENT DOCUMENTS

EP        3187243 A1      7/2017

OTHER PUBLICATIONS

PCT/EP2018/074075, International Search Report, dated Oct. 1, 2018, 2 pages.

* cited by examiner

*Primary Examiner* — Timothy C Vanoy
(74) *Attorney, Agent, or Firm* — Whitaker Chalk Swindle & Schwartz PLLC; Charles D. Gunter, Jr.

(57) ABSTRACT

Process for treating flue gases in a circulating dry scrubber device wherein flue gases containing pollutants pass to a reactor where said flue gases contact a sorbent comprising high pore volume and high specific surface area slaked lime or hydrated lime being further sent to a particulate control device where said sorbent particles are separated from said flue gases substantially depleted in pollutants and form respectively a flow of flue gases substantially depleted in pollutants and a flow of sorbent particles being recycled and returned to said reactor.

15 Claims, 3 Drawing Sheets

PROCESS FOR TREATING FLUE GASES IN CDS FLUE GAS TREATMENT

TECHNICAL FIELD

The present invention relates to circulating dry scrubbing (CDS) technologies. More particularly, the present invention relates to a process for treating flue gases in a circulating dry scrubber device wherein flue gases containing pollutants pass from a flue gases source to a reactor where said flue gases contact a sorbent injected to said reactor and form with said sorbent a suspension of sorbent particles in said flue gases wherein at least a fraction of said pollutants are captured by said sorbent and said flue gases start gradually to be transformed into flue gases at least partially and/or substantially depleted in pollutants, said suspension being further sent to a particulate control device where said sorbent particles are separated from said flue gases and form respectively a flow of flue gases substantially depleted in pollutants and a flow of sorbent particles, said flow of flue gases substantially depleted in pollutants being evacuated from the particulate collection device towards a chimney, said flow of sorbent particles being at least partially recycled and returned to said reactor.

STATE OF THE ART

The combustion flue gases contain substances considered harmful to the environment, generally called pollutants. Flue gases treatment is more and more often performed in order to remove or neutralize those harmful substances, mainly acidic components such as HCl, HF and $SO_2$, $SO_3$. Various processes are used for flue gas treatment, including the scrubbing technology.

A first type of such technology is the wet scrubber technology using wet scrubbers which work generally via the contact of target compounds or particulate matter with a scrubbing liquid which can be water for dust or solutions or suspensions of reagents for targeting specific compounds. Document US 2009/162269 is related to a wet flue gas desulfurization (WFGD) process. Such process uses a purge liquid to purge chloride and unwanted compounds from the WFGD system. The purge liquid is typically reverted to a wastewater treatment facility. A wastewater treatment facility represents high capital and operating costs. In order to minimize the costs of such installation, the purge liquid is recycled and mixed with fly ash from the flue gas stream to form a moistened fly ash and the moistened fly ash mixture is injected into the flue gas stream, thereby reducing the amount of purge liquid sent to the wastewater treatment plant.

A second type of scrubbing technology includes the dry scrubbing systems and the semi-dry scrubbing systems, also called semi-wet scrubbing systems. Those systems in comparison to the wet scrubbers do not saturate the treated flue gas with moisture. In some cases, no moisture is added, while in other cases only the amount of moisture that can be evaporated in the flue gas without condensing is added.

The main use of dry or semi-dry scrubbing devices is related to the capture and removal of acid gases such as sulfur oxides and hydrochloric acid primarily from combustion sources.

In the present disclosure, the terms "circulating dry scrubber device" or "circulating dry scrubber installation" or "circulating dry scrubber systems" refers to either circulating dry scrubber systems or circulating semi-dry scrubber systems.

Circulating dry scrubber (CDS) technology was first developed for $SO_2$ removal in coal-fired power plants. Today it is also used in flue gas treatment for industrial furnaces and boilers that use biomass, industrial or municipal waste as fuels. The CDS process is based on the recirculation of residues collected from particulate control device, comprising unreacted sorbent, reaction products and combustion dust, notably fly ash.

A CDS unit generally comprises a reactor for receiving flue gases and sorbents which are generally calcium-based sorbents. The reactor is followed by a particulate control device which filters the solids (also called "residues" and comprising unreacted sorbent, reaction products and fly ash) from the gas released. These solids are partially recycled into the reactor afterwards through a recycling loop. Some fresh sorbent can be periodically or continuously added to the reactor, before or after. In most cases water is injected into the reactor and/or onto the solids and/or elsewhere in the loop, for temperature control, to improve the pollutants removal performance and to re-activate the residues. Some COS facilities may comprise a hydrator (also called slaking unit) and use quicklime CaO that is hydrated prior to entering the CDS process. Some other CDS facilities do not comprise any hydrator and the fresh sorbent injected is hydrated lime.

According to U.S. Pat. No. 8,709,348, although CDS is called a "dry" scrubbing process, it is water, either adsorbed or sprayed onto the powdery sorbent (including the recirculated/recycled material), that is the reactive phase accomplishing $SO_2$ capture with the powdery sorbent, typically slaked (also called hydrated) lime to form a $CaSO_3/CaSO_4$ reaction product.

As the wetted area of each particle begins to evaporate, $SO_2$ is absorbed and reacts with the dissolved $Ca(OH)_2$ of slaked lime to form mostly $CaSO_3 \cdot 1/2\ H_2O$. Since $CaSO_3 \cdot 1/2\ H_2O$ is relatively insoluble under these conditions, fine crystals will precipitate in solution and tend to block or cover unused hydrate surface area (see U.S. Pat. No. 8,709,348).

According to U.S. Pat. No. 8,709,348, in a typical COS system, about 95-99% of the captured solid materials are recycled back to the reactor in an effort to increase the sorbent utilization. The remaining powdery sorbent are purged from the CDS system for disposal. This purge stream contains fly ash, sorbent by-product, and unreacted sorbent. In some cases, the concentration of unreacted sorbent can exceed 20 weight % of this purge stream. This loss of unreacted sorbent in the purge stream, as well as the loss due to spent sorbent in the reaction, must be replenished by the addition of fresh sorbent, thereby increasing the required sorbent-to-sulfur ratio for the CDS system.

Such a process is well known in the art, see for example in document U.S. Pat. No. 8,709,348 describing many attempts made to improve sorbent use for dry scrubbing technologies, such as optimization of lime hydrate (hydrated or slaked lime) surface area and reactivation of lime in the recycle stream. However, those attempts have not been successful in optimization of sorbent use for circulating dry scrubbing technologies.

Indeed, following U.S. Pat. No. 8,709,348, optimization of specific surface area of the sorbent to improve reactivity towards acid gas capture has been described as useless in CDS considering the high recycling rate which provides additional opportunity for a standard sorbent to react and the reactivation of lime in the recycling stream. With respect to reactivation of lime in the recycle stream by adding water, it is mentioned that problems related to solids deposition and difficulties in cleaning filter cakes from fabric filtration devices may be an issue and proposes to add deliquescent salts. However, those salts will not really provide a good solution as additives such as calcium chloride will add to operating costs.

The solution to improve the use of the sorbent for dry scrubbing technologies described in document U.S. Pat. No. 8,709,348 is to provide a classifier connected to the filter unit to receive sorbent particles therefrom for separating particles into a recycle stream connected to the reactor for reuse in the reactor, and a purge stream typically sent to a landfill. The classifier is operatively connected to receive particles from the purge stream. The classifier is configured to separate particles from the purge stream into a coarse solids recovery stream connected to recover coarse solids from the classifier and fed into the reactor, and a waste stream for disposal of fine particles from the classifier. It has been identified according to this document that the coarse solids recovery stream contains more unreacted lime which can still be used in the CDS process.

Document U.S. Pat. No. 6,508,994 relates to solutions for solving the handling problem of sorbent containing slaked lime. It is disclosed in this document that for avoiding problems during storage, handling and transportation of slaked lime, the product should contain a very low amount of water but express at the same time that slaked lime product with a very low water content typically present a low specific surface area. For solving this problem, this document proposes to slake lime in situ and inject the slaked lime freshly produced immediately in the flue gases (within 1 minute). This document discloses that the slaked lime shall contain at least 5 weight % water and preferably between and 20 weight % water to reach higher porosity properties, while being silent about the measurement of porosity properties thereby obtained. However, the slaked lime thereby obtained shall be injected into the gas treatment unit within one minutes to avoid clogging problems as the slaked lime with its high surface area and high porosity can absorb a larger amount of water with respect to conventional slaked lime.

Document EP 2260923 relates to a similar technology than document U.S. Pat. No. 8,709,348, while a portion of the discarded sorbent being reactivated with water for being returned in the reactor, in a controlled process based on measurements properties of residues.

Document US 2014/0352530 is related to the field of gas cleaning systems and to a method for controlling such systems. This document addresses the problem of the formation of dust material upon reaction of absorbent material with gaseous pollutants. Some substances formed such as calcium chloride is prone to make the dust material sticky, which can cause severe operational disturbances in a gas cleaning plant. In order to prevent such formation of sticky dust material, a method is provided wherein a portion of the dust material formed after contact of an absorbent and the gaseous pollutant is separated from the hot process gas and at least one dust parameter is measured. The dust parameter is selected from the density of the separated dust material, the friction of the separated dust material, the hygroscopicity of the separated dust material, and an electrical property of the separated dust material. Based on this measurement, at least one operating parameter of the gas cleaning system is controlled. Those operating parameters include: supply of fresh absorbent to the gas cleaning system, supply of water to the gas cleaning system, the rate of recirculating separated dust material to the gas cleaning system and the temperature of the hot process gas at an inlet to the gas cleaning system. In this method, burnt lime or hydrated lime is used as fresh sorbent.

As similar process, with the same objective than the document US 2014/0352530 is presented in document EP 1815903.

Another way to improve the flue gas treatment is disclosed in document U.S. Pat. No. 7,857,889. According to this document, the mass flow of the supplied fresh sorbent is regulated as a function of the concentration of fresh sorbent and/or at least one sorbed pollutant in the recirculated solid matter which is determined in a substantially continuous manner. According to the invention, the concentration of fresh (unloaded) sorbent, in particular hydrated lime, and/or of sorbed pollutant, in particular chloride, sulphite and/or fluoride, is determined in this way. The supply of the fresh sorbent is adjusted on the basis of the determined concentration of the respective component(s).

The focus of this document remains to provide the quickest possible reaction to system changes by the substantially continuous determination of the concentration of the fresh sorbent and/or of the sorbed pollutant in the recirculated solid matter for example by utilizing a Fourier Transform near-infrared spectrometer (FT-NIR spectrometer). This enables a continuous quantitative analysis of the recirculated solid matter. The analysis can be carried out in-situ by utilizing a probe disposed in the exhaust gas purification system.

Document U.S. Pat. No. 8,906,333 aims to solve the problem of corrosion of the air preheater present in circulating dry scrubbers. In the case of boilers using combusting fuel of high sulphur content, there is a problem of condensation of $SO_3$ in the air preheater which corrodes the air preheater. Instead of providing elements of the air preheater made of a material such as enamel, which provides better resistance to corrosion but which is more expensive, sorbent is injected upstream to the air preheater such that the sorbent can react with the $SO_3$ condensate and protect the air preheater from corrosion.

As it can be seen, many flue gases treatment processes using circulating dry scrubbing technologies have been developed in an attempt to optimize sorbent consumption of CDS technologies. However, most of them require complex controlling systems or cumbersome equipment. Those processes involves either excess of sorbent consumption which has to be landfilled afterwards, thereby increasing the environmental impact and costs of the processes, or require large equipment designs and utilities such as air, electricity, due to the large amount of sorbent material used or even show a regular occurrence of acid peak which remains difficult to mitigate.

The document WO9616722 presents a method for separating gaseous pollutants from hot process gas characterized in that burnt lime is added as fresh sorbent and that the major part of the dust separated in the dust separator is supplied to and discharged from the mixer in a substantially continuous flow, the dust being kept so long in the mixer and being recirculated so many times that the total residence time of the burnt lime in the mixer in moistened state is sufficiently long for the burnt lime to have time to react substantially completely with water supplied to the mixer and form slaked lime. This document advises the use of burnt lime rather than slaked lime. Slaked lime is described as comparatively expensive and so, various experiments have been made to use burnt lime instead, which is comparatively less expensive. Lime slaking plant is expensive and the expected profit when changing from slaked lime to burnt lime failed to appear.

SUMMARY OF THE INVENTION

The present invention encounters to solve at least a part of these drawbacks by providing a process allowing: to reduce the amount of sorbent to use in order to reach required emission standards, to reduce the quantity of residues to be landfilled, and/or to reduce the size of the required equipment for treating flue gases and at the same time to improve mitigation of acid peaks without requiring a complex controlling loop.

To solve this problem, it is provided according to the present invention, a process for treating flue gases in a circulating dry scrubber device wherein flue gases containing pollutants pass from a flue gases source to a reactor where said flue gases contact a sorbent injected to said reactor and form with said sorbent a suspension of sorbent particles in said flue gases wherein at least a fraction of said pollutants are captured by said sorbent and said flue gases start gradually to be transformed into flue gases at least partially and/or substantially depleted in pollutants, said suspension being further sent to a particulate control device where said sorbent particles are separated from said flue gases and form respectively a flow of flue gases substantially depleted in pollutants and a flow of sorbent particles, said flow of flue gases substantially depleted in pollutants being evacuated from the particulate collection device towards a chimney, said flow of sorbent particles being at least partially recycled and returned to said reactor characterized in that said sorbent injected to said reactor consists essentially of slaked lime having a BJH total pore volume of at least 0.15 cm$^3$/g and a BET specific surface area of at least 25 m$^2$/g.

According to the invention, the expression "consists essentially of slaked lime" means that any additional ingredient, different from slaked lime is present in minor amounts in said sorbent, being understood that these latter do not substantially modify the properties of said sorbent.

Preferably, the sorbent injected to said reactor is of slaked lime having a BJH total pore volume of at least 0.15 cm$^3$/g and a BET specific surface area of at least 25 m$^2$/g.

Preferably, the flue gas source, the reactor and the particulate control device are connected directly or indirectly through pipes.

According to the invention, the term "reactor" can refer to a pipe section through which the raw flue gas is flowing, said pipe section comprising a sorbent inlet for injecting sorbent in said pipe section or the term "reactor" can refer to a chamber, for example a venturi chamber, connected to the flue gas source and to the particulate control device. Preferably the flue gas source is connected to the chamber by a first pipe and the chamber is connected to the particulate control device by a second pipe and the inner transversal section of the chamber is wider than the inner transversal section of the first and second pipes, and the sorbent inlet is provided in the said chamber or in the first pipe.

Quicklime is a mineral solid material for which the chemical composition is mainly calcium oxide, CaO. Quicklime is usually obtained by calcination of limestone (mainly CaCO$_3$). The quicklime suitable according to the present invention comprises at least 85% of CaO, advantageously at least 90 weight % CaO, preferably at least 92 weight %, more preferably at least 94 weight % CaO with respect to the total weight of quicklime, as measured with the sugar method (available lime according to standard EN 459)

Quicklime may also contain impurities including for example, sulfur oxide, SO$_3$, silica, SiO$_2$ or even alumina, Al$_2$O$_3$. The impurities are expressed herein under their oxide form, but of course, they might appear under different phases. Within the meaning of the present invention, the impurities may be present at a level from 0.5 to 15 weight %, preferably at most 10 weight %, preferably at most 5 weight %, preferably at most 2 weight %, more preferably at most 1 weight % impurities with respect to the total weight of quicklime.

Quicklime contains generally also some residual limestone, called unburned residues. The quicklime suitable according to the present invention may comprise CaCO$_3$ at an amount, expressed under CaCO$_3$ form, comprised in the range of 0.5 to 10 weight %, preferably equal to or lower than 5 weight %, more preferably equal to or lower than 3 weight %, most preferably equal to or lower than 1 weight % with respect to the total weight of the quicklime.

Quicklime may further comprise MgO at an amount, expressed under MgO form, comprised in the range of 0.5 to 10 weight %, preferably equal to or lower than 5 weight %, more preferably equal to or lower than 3 weight %, most preferably equal to or lower than 1 weight % with respect to the total weight of the quicklime.

In addition, quicklime suitable according to the present invention may comprise Ca(OH)$_2$ resulting from the reaction of CaO with ambient moisture during handling and storage periods, at an amount comprised in the range of 0.5 to 10 weight %, preferably equal to or lower than 5 weight %, more preferably equal to or lower than 2 weight %, most preferably equal to or lower than 1 weight % with respect to the total weight of the quicklime as measured by the loss on ignition method at 550° C.

The CO$_2$ content of the quicklime (representing the unburned limestone, amongst other) is preferably equal to or lower than 3 weight %, preferably equal to or lower than 2%, more preferably equal to or lower than 1 weight % with respect to the weight of quicklime.

The SO$_3$ content (sulphur expressed as SO$_3$ equivalent) of the quicklime is equal to or lower than 1 weight %, preferably equal to or lower than 0.5 weight %, more preferably equal to or lower than 0.2 weight % with respect to the weight of quicklime.

Typically, to form slaked lime, also sometimes called hydrate or hydrated lime, quicklime is provided in presence of water. Calcium oxide from the quicklime reacts quickly with water to form calcium di-hydroxide Ca(OH)$_2$, under the form of slaked lime or hydrated lime, in a reaction called hydration or slaking reaction which is very exothermic. In the following, calcium di-hydroxide will be simply called calcium hydroxide.

It is generally known that slaked lime is obtained by slaking quicklime with water in a reactor while hydrated lime is obtained by slaking quicklime with water in a hydrator.

Within the context of the present invention, the term "slaked lime" is also intended to refer to hydrated lime.

The slaked lime may therefore contain the same impurities than the quicklime from which it is produced.

The slaked lime may also comprise calcium oxide, which might not have been entirely hydrated during the slaking step, or calcium carbonate CaCO$_3$. The calcium carbonate can be originated from the original limestone (unburned) from which said slaked lime is obtained (via calcium oxide)

or being the result of a partial carbonation reaction of slaked lime through the contact with an atmosphere containing $CO_2$.

The amount of calcium oxide in the slaked lime according to the present invention is typically equal to or lower than 3 weight %, preferably equal to or lower than 2 weight % and more preferably equal to or lower than 1 weight % with respect to the total weight of the slaked lime. The amount of CO in slaked lime (mainly under the form of $CaCO_3$) according to the present invention is equal to or lower than 5 weight %, preferably equal to or lower than 3 weight %, more preferably equal to or lower than 2 weight %, with respect to the total weight of the slaked lime according to the present invention.

As it can be seen, the process according to the present invention comprises an injection of a high pore volume and high specific surface area slaked lime as a sorbent at a lower normalized stoichiometric ratio with respect to standard slaked lime and other existing sorbent of the same type, thereby reducing the operational costs of the flue gas treatment by either reducing fresh sorbent consumption, the amount of used sorbent to be stored and landfilled or in an alternative, using less expensive equipment for the CDS unit. The operational costs are lower in such a way that the additional cost supported by the use of a high surface and high porosity product remains lower than the gain in operational costs. While specialty product such as high specific surface area slaked lime has been said in the prior art as irrelevant for use in circulating dry scrubber technologies, it has been surprisingly found according to the present invention that using a high pore volume and high specific surface area slaked lime as a sorbent provides better performance and is economically viable in gas treatment processes Advantageously, said sorbent injected to said reactor is fresh sorbent and/or a mixture of fresh sorbent and said flow of sorbent particles recycled and returned to said reactor.

In a preferred embodiment of the process according to the present invention, said sorbent injected to said reactor is injected from a sorbent mixing zone to said reactor and wherein said flow of sorbent particles recycled from said particulate control device and returned to said reactor is recycled from said particulate control device and returned to said sorbent mixing zone before being sent to said reactor.

More preferably, in the process according to the present invention, said sorbent injected to said reactor is a mixture of fresh sorbent and said flow of sorbent particles recycled and returned to said reactor, further injected from a sorbent mixing zone to said reactor and wherein said flow of sorbent particles recycled from said particulate control device and returned to said reactor is recycled from said particulate control device and returned to said sorbent mixing zone before being sent to said reactor.

In a particular embodiment of the process according to the present invention, said flow of flue gases substantially depleted in pollutants exiting the particulate collection device is partially withdrawn to be recycled back to the reactor.

Preferably, water is further injected to said reactor or to said sorbent mixing zone through water injection means.

In a further more preferred embodiment according to the present invention said sorbent is injected in such a manner that the normalized stoichiometric ratio NSR divided by the conversion x is superior or equal to 1, wherein: $NSR=(n_{Ca})/N$, wherein $n_{Ca}$ is the number of moles of $Ca(OH)_2$ from the fresh sorbent;

wherein $n_P$ is the number of moles of pollutant from the raw flue gas;

wherein N is the stoichiometric number of moles of $Ca(OH)_2$ required according to the theoretical chemical reaction to completely convert one mole of pollutant;

wherein $x=(P_{in}-P_{out})/P_{in}$;

wherein $P_{in}$ is the number of moles of pollutant entering into the circulating dry scrubber device via the raw flue gas and;

wherein $P_{out}$ is the number of moles of pollutant in the flue gas substantially depleted in pollutants being evacuated from the particulate collection device.

Preferably, said sorbent is injected such as the normalized stoichiometric ratio NSR is of maximum 4.

By the terms "stoichiometric ratio" within the meaning of the present invention, it is meant the number of mol of $Ca(OH)_2$ from the fresh sorbent divided by the number of mol of $SO_2$ from the raw flue gas.

By the term "normalized stoichiometric ratio" NSR within the meaning of the present invention, it is meant the number of moles of $Ca(OH)_2$ from the fresh sorbent divided by the number of moles of pollutant, e.g. $SO_2$, $SO_3$, HCl, from the raw flue gas and defined as aforementioned by the equation:

$$NSR=(n_{Ca}/n_P)/N$$

By the term "conversion x" within the meaning of the present invention, it is meant the number of moles of pollutant reacted divided by the number of moles of pollutant entering into the circulating dry scrubber device via the raw flue gas. The conversion x is defined by the aforementioned equation:

$$x=(P_{in}-P_{out})/P_{in}$$

The value of x can be represented either as a fraction: $0<x<1$, or as a percentage: $0<x<100\%$.

As it can be seen, the process according to the present invention comprises an injection of a sorbent with high porosity features at a normalized stoichiometric ratio of at least 1 and/or lower than or equal to 4, which is a much lower normalized stoichiometric ratio with respect to standard slaked lime and other existing sorbent of the same type, thereby reducing the operational costs of the flue gas treatment by either reducing fresh sorbent consumption, the amount of used sorbent to be stored and landfilled or in an alternative, using less expensive equipment for the COS unit. The operational costs are lower in such a way that the additional cost supported by the use of a high surface and high porosity product remains lower than the gain in operational costs. For instance, according to the present invention, the conversion of $SO_2$ was 84% with a normalized stoichiometric ratio of 1.5 with high surface and high porosity hydrated lime, according to the invention, while in the same operating conditions, the $SO_2$ conversion was only 70% using standard hydrated lime of the prior art with the same normalized stoichiometric ratio of 1.5.

Preferably, according to the present invention, said pollutant comprise $SO_2$ content and/or wherein the said sorbent is injected such as the normalized stoichiometric ratio NSR is of maximum 2.

Elsewhere, according to the present invention, the maximum peak of $SO_2$ released at the stack reached less than 20 mg/Nm$^3$ using high surface and high porosity hydrated lime, according to the invention, while regular peaks of $SO_2$ above 100 mg/Nm$^3$ have been observed using standard hydrated lime of the prior art in similar conditions. The process according to the present invention is being described with a powdery sorbent comprising at least a high pore volume and high specific surface area slaked lime injected in the flue gases. Of course, the high pore volume and high specific surface area slaked lime can be produced by the manufacturer and transported to the site where the flue gas treatment shall be performed or can be produced in situ from quicklime using a process for manufacturing said high pore volume and high specific surface area slaked lime as described in EP0861209, EP1896364, EP3130562 or even in the not yet published international patent application PCT/EP2016/064740 or PCT/EP2016/064701 in the name of the present applicant, which content is hereby incorporated in reference.

Preferably, said high pore volume and high specific surface area slaked lime injected in the process according to the present invention presents a BJH partial pore volume consisting of pores with a diameter ranging from 100 to 400 Å equal to or greater than 0.10 cm$^3$/g, preferably equal to or greater than 0.12 cm$^3$/g, more preferably equal to or greater than 0.15 cm$^3$/g.

By the terms BJH partial pore volume, it is meant within the meaning of the present invention, the partial pore volume determined by manometry with adsorption of nitrogen after degassing in vacuum at 190° C. for at least 2 hours and calculated according the multipoint BJH method from the desorption curve for pores having a diameter ranging from 100 to 400 Å, as described in the ISO 9277/2010E standard.

In a preferred embodiment of the process according to the present invention, said high pore volume and high specific surface area slaked lime presents a BJH pore volume obtained from nitrogen desorption equal to or lower than 0.30 cm$^3$/g.

More preferably, said high pore volume and high specific surface area slaked lime presents a BJH total pore volume equal to or greater than 0.17 cm$^3$/g, preferably equal to or greater than 0.19 cm/g, advantageously equal to or greater than 0.20 cm$^3$/g.

By the terms BJH total pore volume, it is meant within the meaning of the present invention, the total pore volume determined by manometry with adsorption of nitrogen after degassing in vacuum at 190° C. for at least 2 hours and calculated according the multipoint BJH method from the desorption curve for pores having a diameter lower than or equal to 1000 Å, as described in the ISO 9277/2010E standard.

In a further preferred embodiment of the process according to the present invention, said slaked lime has a BJH total pore volume inferior or equal to 0.30 cm$^3$/g.

In a particular embodiment of the process according to the present invention, said high pore volume and high specific surface area slaked lime presents a BET specific surface area, calculated according to the BET method (ISO 9277:2010E standard) and obtained from nitrogen adsorption equal to or greater than 28 m$^2$/g, preferably equal to or greater than 30 m$^2$/g, more preferably equal to or greater than 32 m$^2$/g, advantageously equal to or greater than 35 m$^2$/g.

By the terms "BET specific surface area calculated according to the BET method (ISO 9277:2010E standard)", it is meant the specific surface area of the lime product measured by manometry with adsorption of nitrogen after degassing in vacuum at 190° C. for at least 2 hours and calculated according to the multipoint BET method as described in the ISO 9277:2010E standard.

In a more particular embodiment of the process according to the present invention, said high pore volume and high specific surface area slaked lime presents a BET specific surface area calculated according to the BET method (ISO 9277:2010E standard) and obtained from nitrogen adsorption equal to or lower than 50 m$^2$/g.

Advantageously, in the process according to the present invention, the sorbent is recycled at a recycling ratio comprised between 0.5 and 300, advantageously between 2 and 150, preferably between 10 to 60, the recycling ratio being defined as the injection rate of sorbent particles recycled and returned to said reactor divided by the injection rate of fresh sorbent. More particularly, in the process according to the present invention, the reactor presents a temperature at a reactor outlet between 70° C. and 220° C.

In yet another preferred embodiment of the present invention, said high pore volume and high specific surface area slaked lime presents an alkali metal content that is equal to or greater than 0.2% and equal to or less than 3.5% based on the total weight of said high pore volume and high specific surface area slaked lime.

Preferably, said alkali metal is sodium or potassium or lithium or a combination thereof, more preferably sodium or potassium or a combination thereof, even more preferably sodium.

In an embodiment of the present invention, said suspension stays in movement inside said reactor for a predetermined residence time, preferably superior than 1 seconds, more preferably superior than 5 seconds, and preferably inferior than 20 minutes, more preferably inferior than 5 minutes, more preferably inferior than 1 minute.

In a more preferred embodiment of the process according to the present invention, water is injected with a sufficient amount for having a moisture content in the sorbent injected to said reactor between 0.1 and 10 weight % based on the total weight of said sorbent injected or for having a gas moisture content gas/water ratio between 5 and 35 vol %, preferably between 7 and 30 vol %, more preferably between 10 and 25 vol %.

Further, according to a special embodiment, said high pore volume and high specific surface area slaked lime presents a residual moisture content, said residual moisture content being equal to or less than 3% by weight, more preferably equal to or less than 2% by weight, even more preferably equal to or less than 1% by weight.

In addition, in the process according to the present invention, water is injected with a sufficient amount for having a moisture content in the sorbent injected to said reactor between 0.1 and 10 weight % based on the total weight of said sorbent injected or for having a gas moisture content gas/water ratio between 5 and 35 vol %, preferably between 7 and 30 vol %, more preferably between 10 and 25 vol %.

Other embodiments of the process according to the present invention are mentioned in the appended claims.

Other characteristics and advantages of the present invention will be derived from the non-limitative following description, and by making reference to the drawings and the examples.

BRIEF DESCRIPTION OF THE DRAWINGS

In the drawings, the same reference numbers have been allocated to the same or analogue element.

DESCRIPTION OF THE INVENTION

Figure 1:
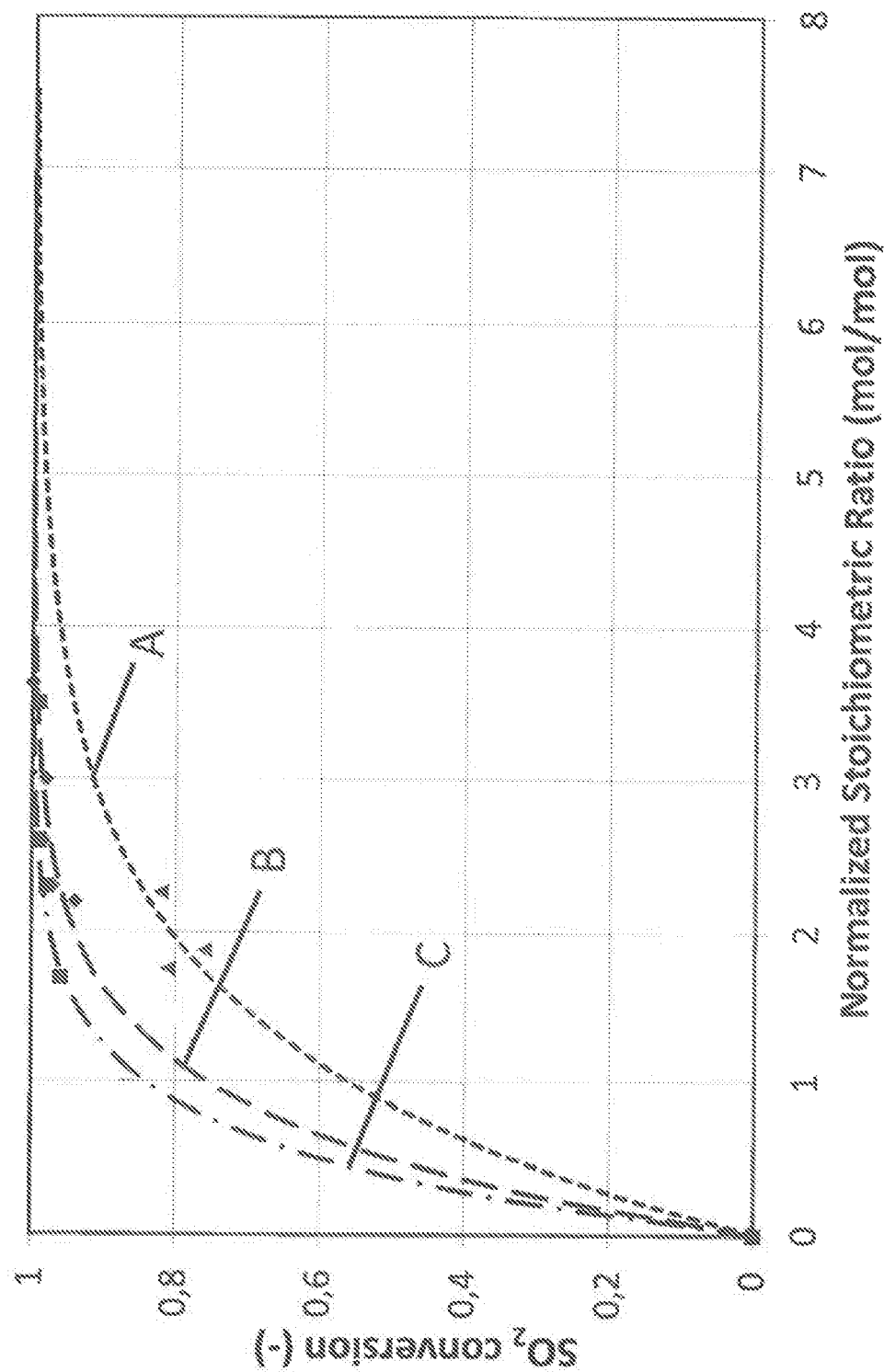
FIG. 1 is a graph showing the relationship between normalized stoichiometric ratio and SO$_2$ conversion for three different sorbents at different normalized stoichiometric ratio.

This invention relates to the use of high pore volume and high specific surface area slaked lime as a sorbent in circulating dry scrubber units.

While the belief in the literature mentions no benefit with enhanced materials due to high recycling conditions, the higher pore volume and the higher surface area of those products brings surprisingly additional performances.

The process for treating flue gases in flue gas treatment units according to the present invention is a process wherein flue gases containing polluting components pass from a flue gases source to a reactor. In the reactor, said flue gases contact a high pore volume and high specific surface area slaked lime as a sorbent injected to a reactor, optionally from a sorbent mixing zone or injection zone to said reactor. The high pore volume and high specific surface area slaked lime present a BJH pore volume equal to or greater than 0.15 $cm^3/g$, preferably equal to or greater than 0.17 $cm^3/g$, preferably equal to or greater than 0.19 $cm^3/g$, advantageously equal to or greater than 0.20 $cm^3/g$ and presents a BET specific surface area calculated according to the BET method (ISO 9277:2010E standard) and obtained from nitrogen adsorption equal to or greater than 25 $m^2/g$, preferably equal to or greater than 30 $m^2/g$, more preferably equal to or greater than 32 $m^2/g$, advantageously equal to or greater than 35 $m^2/g$.

The flue gases form with said sorbent a suspension of sorbent particles in said flue gases which stays in movement inside said reactor for a residence time which depends on the size of the circulating dry scrubber device, and on the gas flow rate, before being sent to a filter unit where said sorbent particles are separated from said flue gases and form respectively a flow of flue gases and a flow of sorbent particles. The filter unit can be a bag house filter or an electrostatic precipitator, or any other suitable particle collection device.

Said flow of flue gases being depleted in polluting component exits the filter unit to enter a chimney. Part of the flue gas can also be recycled back to the reactor. Of course, between the filter unit and the chimney, other devices can be present.

A part of the flow of sorbent particles is recycled with a predetermined recycling ratio (injection rate of recycled sorbent divided by the injection rate of fresh sorbent) and returned to said sorbent mixing zone or injection zone for being afterwards reinjected inside said reactor.

In the process according to the present invention, the high pore volume and high specific surface area slaked lime, optionally doped with an alkali metal is injected at a normalized stoichiometric ratio NSR typically comprised between 1 and 4, preferably between 1.5 and 3, more preferably below or equal to 2.

Said sorbent injected from a sorbent mixing zone or injection zone is a mixture of fresh sorbent fed from a sorbent storage device and said flow of (spent) sorbent particles being recycled.

Water is further injected in said sorbent mixing zone or injection zone or in said reactor.

Indeed, two ways to handle CDS process exist. In a first way, the residues and the sorbent are wetted before reinjection at the bottom of the reactor in a said sorbent mixing zone. In the second way, water is injected in the reactor and not directly on the residues and sorbent.

Said water is injected at a sufficient amount for having a moisture content in the sorbent injected from said sorbent mixing zone between 0.1 and 10 weight %, in particular between 0.5 and 8 weight %, based on the total weight of said sorbent injected or for having a gas moisture content 5 and 35 vol. %, preferably between 7 and 30 vol. %, more preferably between 10 and 25 vol. %.

Preferably, said predetermined recycling ratio is comprised between 0.5 and 300, preferably between 2 and 150, more preferably between 10 and 60.

More particularly, the reactor presents a temperature at a reactor outlet between 70° C. and 220° C.

If the sorbent is a high pore volume and high specific surface area slaked lime doped with an alkali metal, the alkali metal (sodium or potassium or lithium or a combination thereof) content is equal to or greater than 0.2% and equal to or less than 3.5% based on the total weight of said high pore volume and high specific surface area slaked lime.

Preferably, said high pore volume and high specific surface area slaked lime presents a residual moisture content, said residual moisture content being equal to or less than 3% by weight, more preferably equal to or less than 2% by weight, in particular equal to or less than 1% by weight.

EXAMPLES

Example 1.—

During an industrial trial, a standard hydrated lime (curve A), a high pore volume and high specific surface area slaked lime according to the invention (curve B) and a sodium doped high pore volume and high specific surface area slaked lime according to the invention (curve C) were injected in a circulating dry scrubber unit (CDS).

The scrubber unit is an Enhanced All-Dry unit from Fives Solios. The temperature at the outlet of the reactor was in the range between 140° C. to 160° C., the amount of water injection was set between 2 and 6 $dm^3$ per minute and the recycling ratio (injection rate of recycled material divided by the injection rate of fresh product) was varying from 30 to 40.

Each sorbent was injected during two weeks using two different injection rates (of fresh sorbent) ranging from 150 to 300 kg/h. As a consequence, a minimum of two normalized stoichiometric ratios were used for each sorbent. The variation range of the normalized stoichiometric ratio was between 1.5 and 4. This allows a comparison of performance based on the stoichiometric ratio as seen in the graph of FIG. 1.

For the same removal performance, the consumption of reagent is divided by up to 2 when using the sodium doped high pore volume and high specific surface area slaked lime versus the standard hydrated lime according to prior art.

Furthermore, removal rate for $SO_2$ was 84% with a normalized stoichiometric ratio of 1.5 with high surface and high porosity hydrated lime, 94% for same conditions with the sorbent comprising sodium doped high pore volume and high specific surface area slaked lime while in the same operating conditions $SO_2$ removal rate was only 70% using standard hydrated lime with the same normalized stoichiometric ratio of 1.5.

Example 2.—

The testing conditions of example 1 have been reproduced, but this time with measurements allowing identifying a comparison of $SO_2$ peak mitigation performance.

Figure 2:
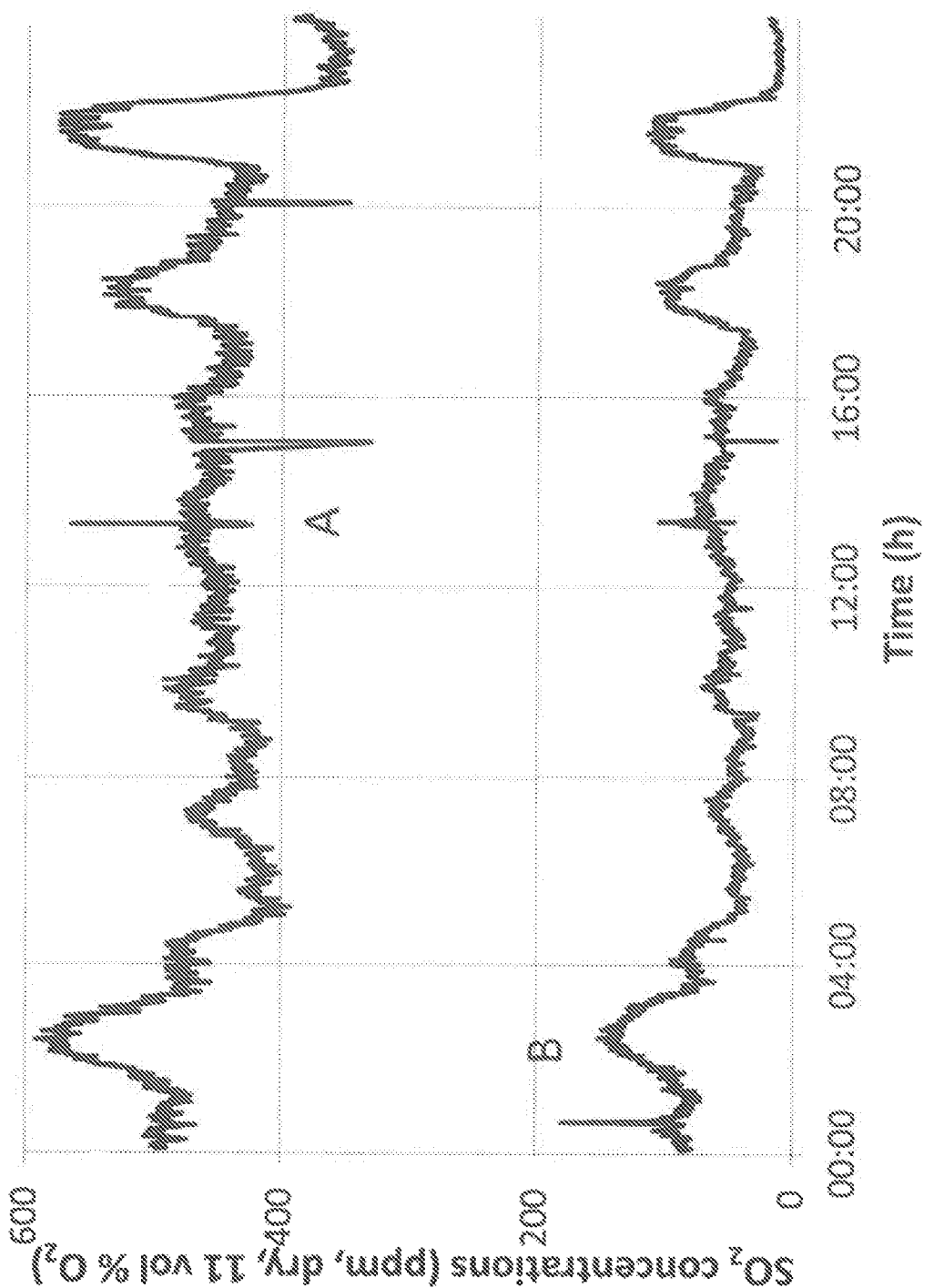
FIG. 2 is a graph showing the concentration of SO$_2$ in flue gases before and after the gas treatment with a standard slaked lime.
Figure 3:
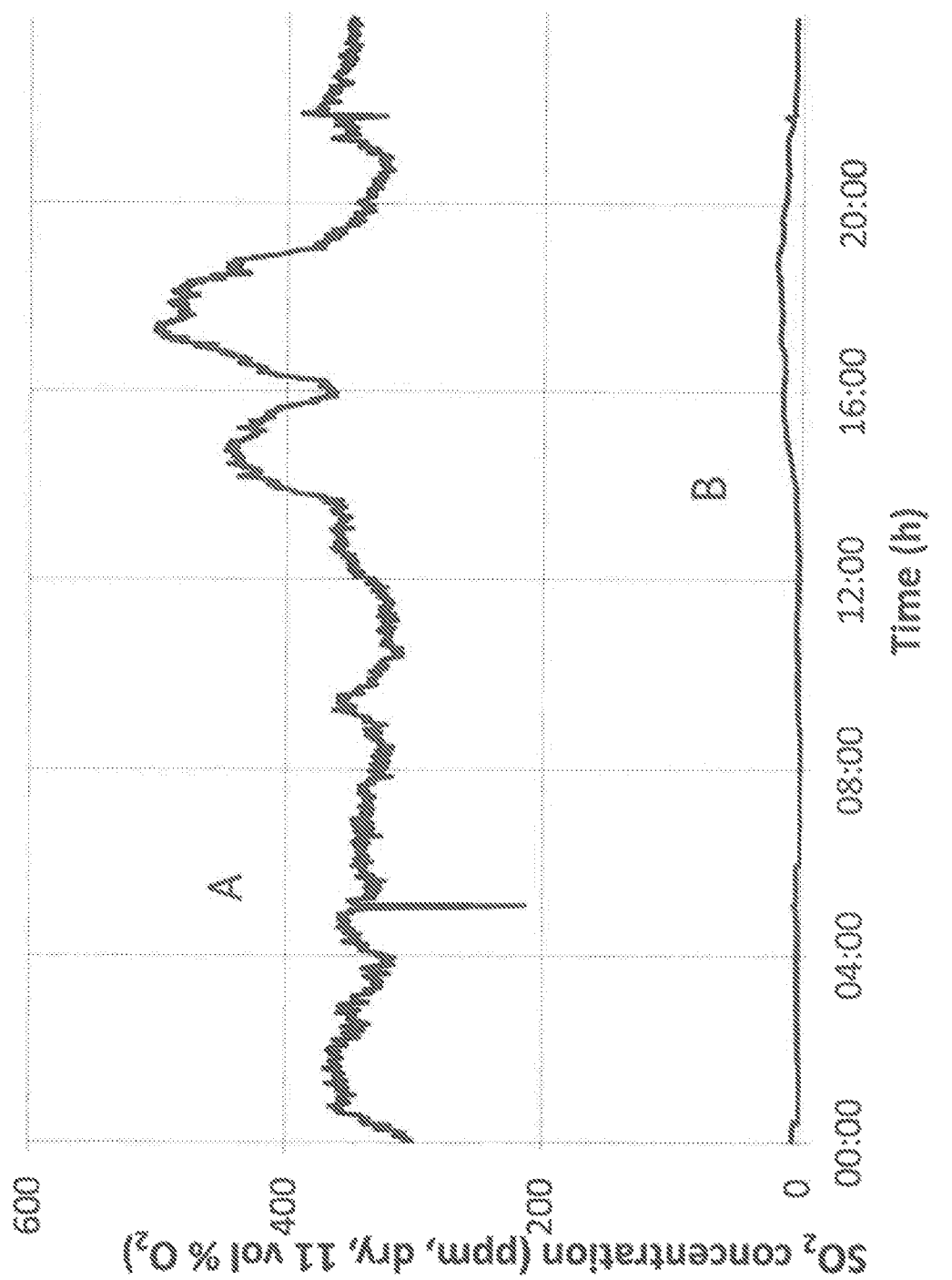
FIG. 3 is a graph showing the concentration of $SO_2$ in flue gases before and after the gas treatment with a sorbent composition according to the present invention.

As it can be seen in FIG. 3, a complete absence of peaks and a very low level of $SO_2$ is shown with the use of high pore volume and high specific surface area slaked lime (according to the invention) downstream of the flue gas treatment unit (Curve B—clean gas) in comparison to upstream of the flue gas treatment unit (Curve A—raw gas). In contrast, using standard hydrated lime according to prior art shows in FIG. 2 peaks of $SO_2$ and higher levels of $SO_2$ in the clean gas (Curve B downstream of the flue gas treatment unit), in comparison to curve A being upstream of the flue gas treatment unit. As one can see, the maximum peak of $SO_2$ released at the stack reached less than 20 mg/$Nm^3$ using high surface and high porosity hydrated lime according to the invention, while regular peaks of $SO_2$ above 100 mg/$Nm^3$ have been observed using standard hydrated lime of the prior art in similar conditions.

Example 3

During an industrial trial, a sodium doped high pore volume and high surface area hydrated lime according to the invention was injected in a Dustex circulating dry scrubber. Performances were compared when using a Flue Gas Treatment grade standard hydrated lime.

The scrubber unit comprises a circulating fluidized bed reactor where water is sprayed at the bottom, one bag house filter separated into 2 parts and 2 recycling air slides bringing back the residues to the reactor.

The temperature at the outlet of the reactor was set at 105° C. regulated by injection of water in the range of 8 to 9 $m^3$/h sprayed at 35 bars. The flow of solids in the reactor was in the range of 1100 to 1200 g/$Nm^3$. The sorbent was injected over a period of more than 2 weeks to leave enough time for the system to reach a steady state.

The CDS set point targeted a relative constant removal rate of $SO_2$ between 72 and 78%. Samples of residues were collected every day for analysing the performance. Same procedure applied one week before the test with incumbent standard hydrated lime allowing a direct comparison. When using according to the invention the sodium doped high pore volume and high surface area hydrated lime according to the invention, the normalized stoichiometric factor (which is equal to the normalized stoichiometric ratio multiplied by the conversion) was found to be 1.45 for an average removal rate of 75.9% to compare with a normalized stoichiometric factor of 1.67 with an average removal rate of 72.7% with incumbent hydrated lime. With similar removal requirement, the consumption of sodium doped high pore volume and high surface area hydrated lime according to the invention is reduced by 18%.

It should be understood that the present invention is not limited to the described embodiments and that variations can be applied without going outside of the scope of the appended claims.

The invention claimed is:

1. Process for treating flue gases in a circulating dry scrubber device wherein flue gases containing pollutants pass from a flue gases source to a reactor where said flue gases contact a sorbent injected to said reactor and form with said sorbent a suspension of sorbent particles in said flue gases wherein at least a fraction of said pollutants are captured by said sorbent, said suspension being further sent to a particulate control device where said sorbent particles are separated from said flue gases and form, respectively, a flow of flue gases substantially depleted in pollutants and a flow of sorbent particles, said flow of flue gases substantially depleted in pollutants being evacuated from the particulate collection device towards a chimney, said flow of sorbent particles being at least partially recycled and returned to said reactor, wherein said sorbent injected to said reactor consists essentially of slaked lime having a BJH total pore volume of at least 0.15 $cm^3$/g and a BET specific surface area of at least 25 $m^2$/g; and wherein said sorbent injected to said reactor is injected from a sorbent mixing zone to said reactor and wherein said flow of sorbent particles recycled from said particulate control device and returned to said reactor is recycled from said particulate control device and returned to said sorbent mixing zone before being sent to said reactor.

2. Process according to claim 1, wherein said sorbent injected to said reactor is a mixture of fresh sorbent and said flow of sorbent particles recycled and returned to said reactor, further injected from a sorbent mixing zone to said reactor and wherein said flow of sorbent particles recycled from said particulate control device and returned to said reactor is recycled from said particulate control device and returned to said sorbent mixing zone before being sent to said reactor.

3. Process according to claim 1, wherein said flow of flue gases substantially depleted in pollutants exiting the particulate collection device is partially withdrawn to be recycled back to the reactor.

4. Process according to claim 1, wherein water is further injected to said reactor or to said sorbent mixing zone through water injection means.

5. Process according to claim 4, wherein water is injected with a sufficient amount for having a moisture content in the sorbent injected to said reactor between 0.1 and 10 weight % based on the total weight of said sorbent injected or for having a gas moisture content gas/water ratio between 5 and 35 vol %.

6. Process according to claim 1, wherein said sorbent is injected such that the normalized stoichiometric ratio NSR divided by the conversion x is superior or equal to 1, wherein: $NSR=(n_{Ca}/n_P)/N$, wherein $n_{Ca}$ is the number of moles of $Ca(OH)_2$ from the fresh sorbent;

wherein $n_P$ is the number of moles of pollutant from the raw flue gas;

wherein N is the stoichiometric number of moles of $Ca(OH)_2$ required according to the theoretical chemical reaction to completely convert one mole of pollutant;

wherein $x=(P_{in}-P_{out})/P_{in}$;

wherein $P_{in}$ is the number of moles of pollutant entering into the circulating dry scrubber device via the raw flue gas and;

wherein $P_{out}$ is the number of moles of pollutant in the flue gas substantially depleted in pollutants being evacuated from the particulate collection device.

7. Process according to claim 1, wherein said sorbent is injected such that the normalized stoichiometric ratio NSR is a maximum of 4.

8. Process according to claim 1, wherein said pollutant comprises $SO_2$ content and/or wherein the said sorbent is injected such that the normalized stoichiometric ratio is a maximum of 2.

9. Process according to claim 1, wherein said suspension stays in movement inside said reactor for a predetermined residence time which is greater than 1 second and preferably less than 20 minutes.

10. Process according to claim 1, wherein said slaked lime has a BJH partial pore volume of at least 0.1 cm$^3$/g for pore diameters ranging from 100 to 400 Angström.

11. Process according to claim 1, wherein said slaked lime has a BJH total pore volume inferior or equal to 0.30 cm$^3$/g.

12. Process according to claim 1, wherein said slaked lime has a BET specific surface area inferior or equal to 50 m$^2$/g.

13. Process according to claim 1, wherein said slaked lime presents an alkali metal content of at least 0.2% and of maximum 3.5% based on the total weight of the said slaked lime.

14. Process according to claim 1, wherein said alkali metal is selected from the group consisting of sodium, potassium, lithium and a combination thereof.

15. Process according to claim 1, wherein said sorbent is recycled at a recycling ratio comprised between 0.5 and 300, said recycling ratio being defined as the injection rate of sorbent particles recycled and returned to said reactor divided by the injection rate of fresh sorbent.

\* \* \* \* \*